US007619772B2

(12) United States Patent
Fukudome

(10) Patent No.: US 7,619,772 B2
(45) Date of Patent: Nov. 17, 2009

(54) DOCUMENT PROCESSING APPARATUS, CONTROL PROGRAM, AND CONTROL METHOD OF DISPLAYING INFORMATION RELATED TO EACH CHAPTER IN DOCUMENT DATA

(75) Inventor: Kenji Fukudome, Kawabe-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 345 days.

(21) Appl. No.: 11/193,414

(22) Filed: Aug. 1, 2005

(65) Prior Publication Data
US 2006/0238810 A1    Oct. 26, 2006

(30) Foreign Application Priority Data
Apr. 20, 2005    (JP) .............................. 2005-122389

(51) Int. Cl.
*G06F 15/00*    (2006.01)
*G06F 17/00*    (2006.01)

(52) U.S. Cl. .................. 358/1.9; 358/1.18; 715/251; 715/274

(58) Field of Classification Search .............. 715/274, 715/742, 251
See application file for complete search history.

(56) References Cited

U.S. PATENT DOCUMENTS

| | | | |
|---|---|---|---|
| 5,708,806 A * | 1/1998 | DeRose et al. ........... 707/104.1 |
| 5,953,007 A | 9/1999 | Center et al. |
| 6,205,452 B1 * | 3/2001 | Warmus et al. ............. 715/246 |
| 6,411,314 B1 * | 6/2002 | Hansen et al. .............. 715/769 |
| 6,574,002 B1 | 6/2003 | Paczewitz |
| 6,781,709 B2 | 8/2004 | Nozawa |
| 7,412,646 B2 * | 8/2008 | Parikh et al. ................ 715/251 |
| 2003/0053133 A1 * | 3/2003 | Nakagiri et al. ........... 358/1.18 |
| 2003/0056176 A1 * | 3/2003 | Tanaka et al. .............. 715/522 |
| 2004/0128280 A1 | 7/2004 | Gomi et al. |
| 2004/0133856 A1 * | 7/2004 | Miyazato et al. ............ 715/517 |
| 2004/0163049 A1 * | 8/2004 | Mori et al. .................. 715/527 |
| 2005/0134871 A1 * | 6/2005 | Nakagiri ..................... 358/1.6 |
| 2005/0179926 A1 * | 8/2005 | Nishikawa et al. ......... 358/1.13 |
| 2005/0243372 A1 * | 11/2005 | Sato et al. .................. 358/1.18 |
| 2006/0059271 A1 * | 3/2006 | Kato ......................... 709/238 |

FOREIGN PATENT DOCUMENTS

| | | |
|---|---|---|
| JP | 2003-162520 | 6/2003 |
| JP | 2004/139466 | 5/2004 |

OTHER PUBLICATIONS

Hiroshi Yamaki, "How to Use Print Out Setting" Partial English Translation, pp. 1-4, "Adobe Acrobat 6.0 PDF Technical Manual", Nov. 10, 2003, ISBN:4-7741-1859-1, pp. 415-418.

* cited by examiner

*Primary Examiner*—Twyler L Haskins
*Assistant Examiner*—Barbara D Reinier
(74) *Attorney, Agent, or Firm*—Buchanan Ingersoll & Rooney PC

(57) ABSTRACT

A document processing apparatus displays a print setting screen including setting contents related to printing of document data in response to input of information designating initiation of a process to print out document data stored in a storage device. The document processing apparatus has information related to a chapter extracted from document data, and information related to each chapter is displayed on the print setting screen.

9 Claims, 16 Drawing Sheets

FIG.9

```
<?xml version="1.0" encoding="utf-8"?>
<Document title="STAFF REGISTER">
  <Chapter number="1" ctitle="ACCOUNT DEPARTMENT LIST">
    <Person>
      TARO YAMADA 3045
    </Person>
    <Person>
      HANAKO SATO 3321
    </Person>
    ...
  </Chapter>
  <Chapter number="2" ctitle="DEVELOPMENT DEPARTMENT LIST">
  <Person>
      ....
    </Person>
  </Chapter>
  ....
</Document>
```

CHAPTER 1 ACCOUNT DEPARTMENT LIST
CHAPTER 2 DEVELOPMENT DEPARTMENT LIST
. . .

TARO YAMADA 3045
HANAKO SATO 3321
TATSUYA TANAKA 5056
TAMOTSU MORI 4923

```
<! DOCTYPE Document [
    <!ELEMENT Document (Chapter+)>
      <!ATTLIST Document title CDATA #REQUIRED>
    <!ELEMENT Chapter (Person+)>
      <!ATTLIST Chapter number CDATA #REQUIRED>
      <!ATTLIST Chapter ctitle CDATA #REQUIRED>
    <!ELEMENT Person (#PCDATA)>
]>
```

DOCUMENT PROCESSING APPARATUS, CONTROL PROGRAM, AND CONTROL METHOD OF DISPLAYING INFORMATION RELATED TO EACH CHAPTER IN DOCUMENT DATA

This application is based on Japanese Patent Application No. 2005-122389 filed with the Japan Patent Office on Apr. 20, 2005, the entire content of which is hereby incorporated by reference.

BACKGROUND OF THE INVENTION

1. Field of the Invention

The present invention relates to document processing apparatuses, particularly, a document processing apparatus designating printing of a document with respect to a printer, a control program thereof, and a control method thereof.

2. Description of the Related Art

In accordance with the development of recent information processing apparatuses, various techniques have been disclosed for handling document data in document processing apparatuses.

With regards to the technique related to printing document data, Japanese Laid-Open Patent Publication No. 2003-162520 discloses the approach of printing out document data on a chapter-by-chapter basis by entering manually the chapter number of a document in the dialog box directed to print-setting.

The technique disclosed in this publication is advantageous in that document data can be printed out in 1-chapter units. However, the user had to put up with some inconvenience in designating the printing range. In general, the user designates the printing range based on the contents of the document data. In accordance with the technique disclosed in Japanese Laid-Open Patent Publication No. 2003-162520, the user had to identify the chapter number corresponding to the contents of the document data when it is to be printed out.

SUMMARY OF THE INVENTION

In view of the foregoing, an object of the present invention is to facilitate the range designation for the user to print out document data in a document processing apparatus.

According to an aspect of the present invention, a document processing apparatus executing a process to print out document data stored in a storage device at an output apparatus, includes: an input accepting unit accepting input of information, a display control unit causing a display unit to display a print setting screen including setting contents related to printing of document data in response to input of information designating initiation of a process to print out document data at the input accepting unit, and an extraction unit extracting information related to a chapter from the document data. The display control unit causes information related to each chapter extracted by the extraction unit for each chapter included in the document data to be displayed on the print setting menu.

According to another aspect of the present invention, a control program of a document processing apparatus executing a process to print out document data stored in a storage device at an output apparatus, causes the document processing apparatus to execute the steps of: accepting input of information, extracting information related to a chapter from document data, and causing a display unit to display a print setting screen including setting contents related to printing of document data in response to input of information designating initiation of a process to print out the document data. The step of displaying a print setting screen includes the step of displaying information related to each chapter extracted at the extracting step for each chapter in the document data on the print setting screen.

According to a further aspect of the present invention, a control method of a document processing apparatus executing a process to print out document data stored in a storage device at an output apparatus, includes the steps of accepting input of information, extracting information related to a chapter from document data, and causing a display unit to display a print setting screen including setting contents related to printing of document data in response to input of information designating initiation of a process to print out document data. The step of displaying a print setting screen includes the step of displaying information related to each chapter extracted at the extracting step for each chapter in the document data on the print setting screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 represents an XML (eXtensible Markup Language) document as an example of a document.

DESCRIPTION OF THE PREFERRED EMBODIMENTS

First Embodiment

Figure 1:
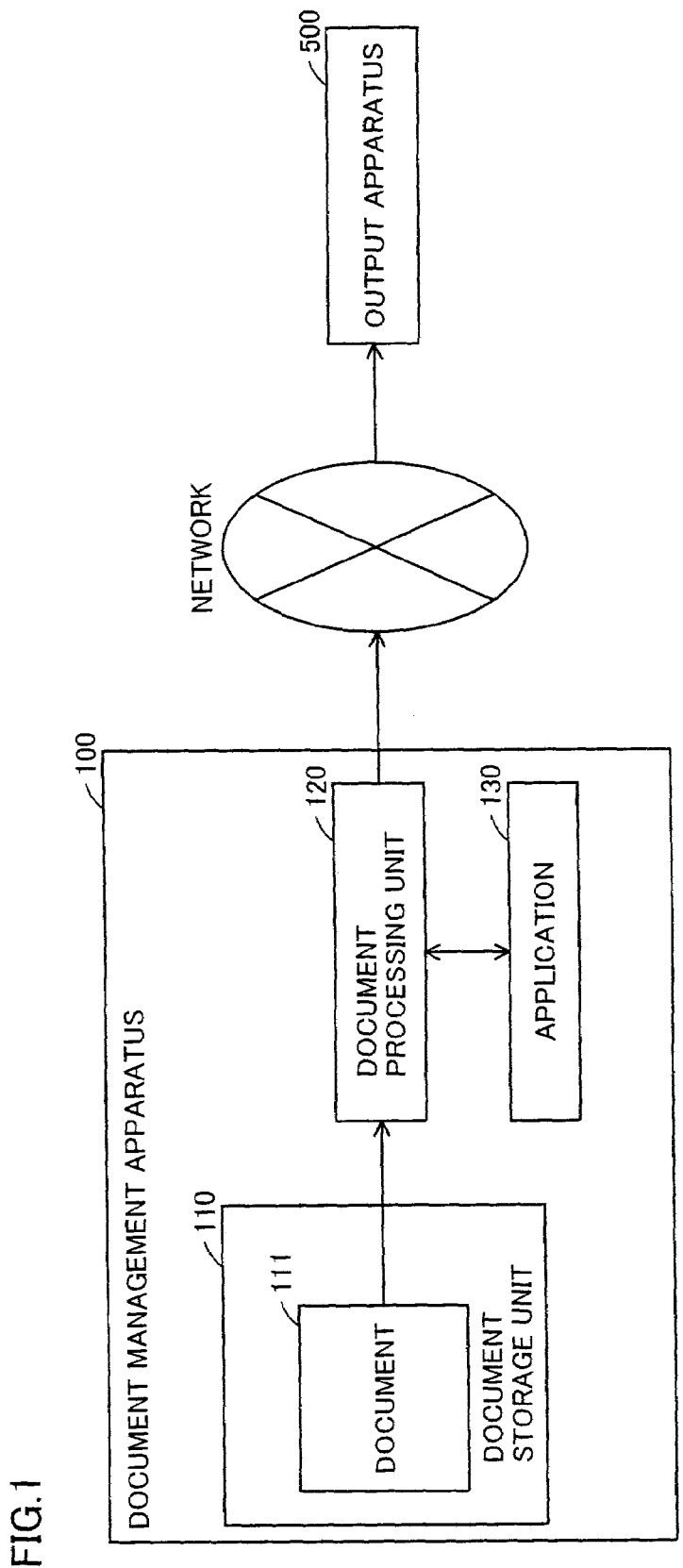
FIG. 1 represents a software configuration of a document management apparatus identified as a first embodiment of a document processing apparatus of the present invention.

FIG. 1 represents a software configuration of a document management apparatus according to a first embodiment of a document processing apparatus of the present invention.

A document management apparatus 100 includes a document storage unit 110 storing document data (hereinafter, simply referred to as "document"), a document processing unit 120 carrying out a process related to display of a chapter structure and/or printing of document 111, and an application 130 presenting various functions such as word processing, spread sheet, photo retouch, drawing or painting, presentation, text editing and the like related to document 111. Application 130 includes the printing function with respect to the OS (Operating System).

Document management apparatus 100 is connected to an output apparatus 500 via a network. Document management apparatus 100 can print out an image of document 111 at output apparatus 500.

Figure 2:
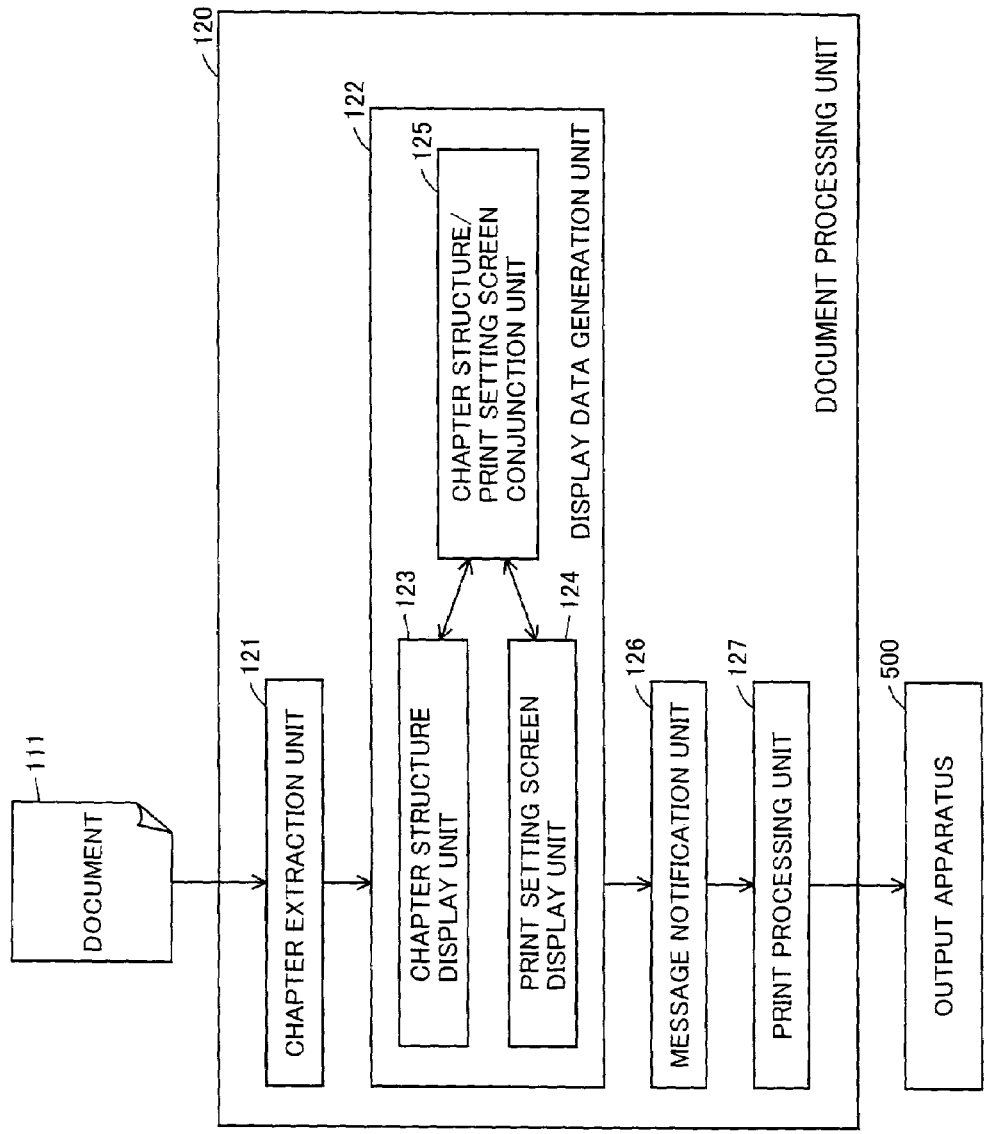
FIG. 2 represents a detailed system configuration of a document processing unit of FIG. 1.

Referring to FIG. 2 representing a detailed system configuration, document processing unit 120 includes a chapter extraction unit 121 extracting a chapter structure of document 111 using application 130, a display data generation unit 122 generating display data using the chapter structure of document 111 extracted by chapter extraction unit 121, a message notification unit 126 executing a process related to message notification such as displaying a message on a display 210 that will be described afterwards, and a print processing unit 127 transmitting data for print out at an external apparatus such as output apparatus 500.

The display data generation unit 122 includes a chapter structure display unit 123, to display a chapter structure display screen, a print setting screen display unit 124, to display a print setting screen, and a chapter structure/print setting screen conjunction unit 125 to modify the display contents of the chapter structure display screen or print setting screen according to the input when an input is received to modify the chapter structure display screen or the print setting screen.

Respective constituent elements in document processing unit 120 are realized by execution of a program stored in HD (Hard Disk) 211 and the like by an CPU 201 that will be described afterwards.

Figure 3:
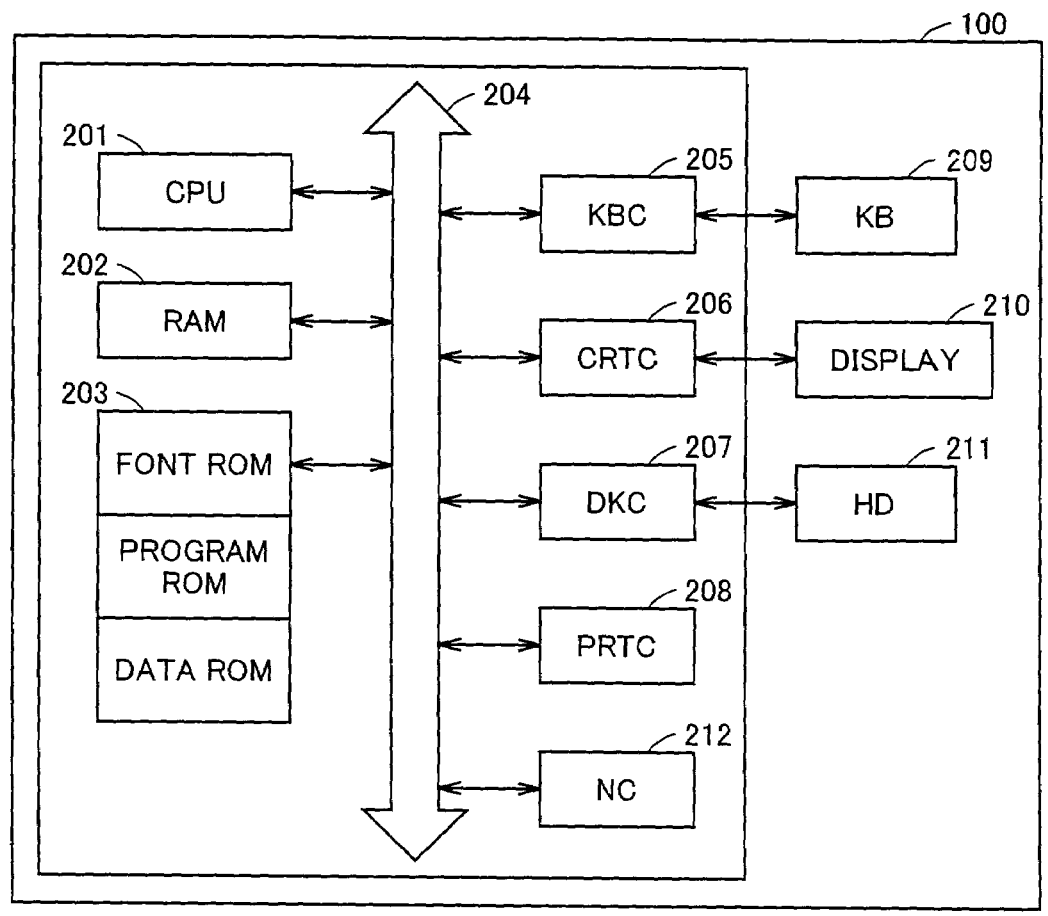
FIG. 3 is a block diagram of the hardware of the document management apparatus of FIG. 1.

Referring to the block diagram of FIG. 3 corresponding to the hardware of document management apparatus 100, CPU 201 executes a program of the OS, general application, binding application, and the like stored in a program ROM (Read Only Memory) of a ROM 203 or loaded to a RAM (Random Access Memory) 202 from an HD 211 to realize the software configuration shown in FIGS. 1 and 2 and/or the procedures in the flow chart that will be described afterwards. RAM 202 functions as the main memory, work area, and the like of CPU 201. A KBC (Key Board Controller) 205 controls the key input from a KB (Key Board) 209 or a pointing device (not shown). A CRTC (CRT Controller) 206 controls the display of display 210. A DKC (Disk Controller) 207 controls the access with respect to a disk type recording medium such as HD 211 or a flexible disk (FD) storing a boot program, various applications, font data, a user file, an edit file that will be described afterwards, and the like. A PRTC (Printer Controller) 208 controls the transfer of signals to/from output apparatus 500 connected via a network. An NC (Network Controller) 212 is connected to a network to execute a communication control process with other apparatuses connected to the network.

Documents handled by document management apparatus 100 of the present embodiment include, for example, an XML document, PDF (Portable Document Format) document, text document and the like. Document management apparatus 100 defines a layered structure of three layers simulating a book of paper medium as the chapter structure of document 111. The upper layer is referred to as "document", simulating one document, defined by attributes associated with the entire document. The next intermediate layer corresponds to chapters in a document. This intermediate layer is referred to as "chapter". An attribute can be defined for each chapter. The lower layer is referred to as "page", corresponding to each page defined by the application program. An attribute can be defined for each of the pages. One document may include a plurality of chapters, and one chapter may include a plurality of pages.

Figure 4:
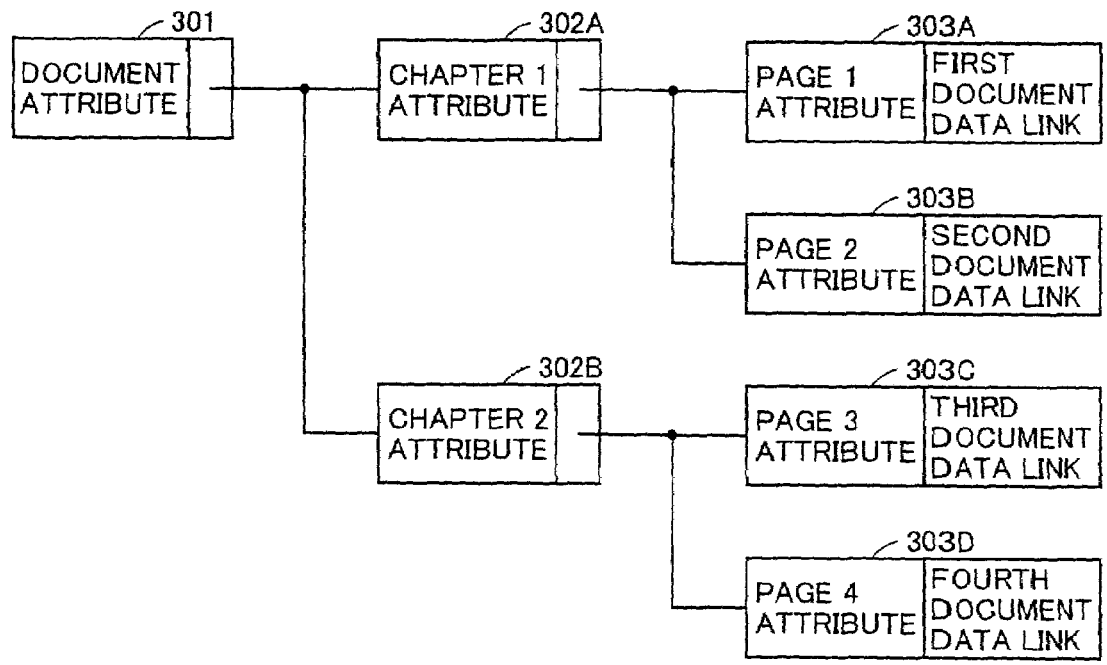
FIG. 4 schematically shows an example of a chapter structure of a document handled by the document management apparatus of the present embodiment.

FIG. 4 schematically shows an example of the chapter structure of a document.

With regards to a document in the present embodiment, the document, chapter and page are represented by corresponding nodes. Since the document and chapter are notions to define the structure of the document per se, the defined attribute value and the link to the lower layer are included as the entity thereof. A page includes, as the entity, data for every page output by the application program. Accordingly, each page includes the link towards the entity of the document (document data) in addition to an attribute value thereof.

Referring to FIG. 4, a document 111 is defined by a document attribute 301. Two chapter attributes (chapter 1 attribute 302A and chapter 2 attribute 302B) are linked to document attribute 301. The link indicates that two chapters are included in document 111. Chapter 1 attribute 302A is linked with two page attributes (page 1 attribute 303A, and page 2 attribute 303B). It is therefore indicated that two pages are included in chapter 1. Each of page 1 attribute 303A and page 2 attribute 303B has an attribute value defined thereto, including the link towards the first document data and the second document data, identified as the entity thereof. Two page attributes (page 3 attribute 303C and page 4 attribute 303D) are linked to chapter 2 attribute 303B. It is therefore indicated that two pages are included in chapter 2. Each of pages 1 and 2 attributes 303C and 303D has an attribute value defined thereto, including the link towards the third document data and fourth document data, identified as the entity thereof.

Figure 5:
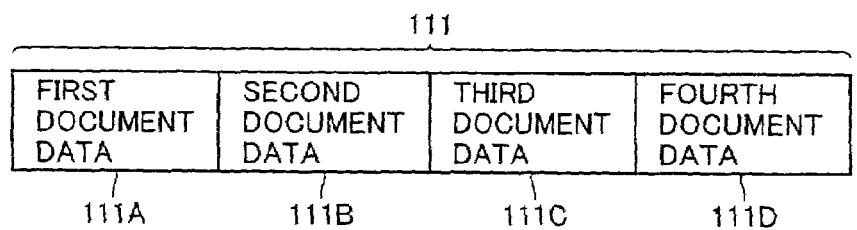
FIG. 5 schematically shows the state of a document stored in an HD (Hard Disk) or the like of FIG. 3.

FIG. 5 schematically shows the state of document 111 stored in an HD 211 or the like. Document 111 is stored in HD 211, for example. In FIG. 5, document 111 includes first document data 111A, second document data 111B, third document data 111C, and fourth document data 111D.

The links towards the first document data and second document data shown in FIG. 4 are directed to first document data 111A and second document data 111B, respectively, of FIG. 5. This implies that the entity of each of pages 303A and 303B is identified as first document data 111A and second document data 111B, respectively. The links towards the third document data and fourth document data of FIG. 4 are directed to third document data 111C and fourth document data 111D, respectively shown in FIG. 5. This means that the entity of each of pages 303C and 303D is identified as third document data 111C and fourth document data 111D, respectively.

It will be understood that the number of chapters and the number of page in each chapter in document 111 set forth above are merely exemplary, and a document including an arbitrary number of chapters and pages can be handled by document management apparatus 100 of the present embodiment.

Document management apparatus 100 of the present embodiment executes various processes such as display of document 111, and can also display the chapter structure of document 111 upon an appropriate operation by the user. In the present embodiment, display of a chapter structure includes the display of a tree structure of the chapters and pages included in document 111, that will be described afterwards based on a chapter structure display screen. The process executed by CPU 201 (chapter structure display process) at document management apparatus 100 when an operation to display a chapter structure is input through keyboard 209 and the like will be described hereinafter with reference to FIGS. 6-8.

Figure 6:
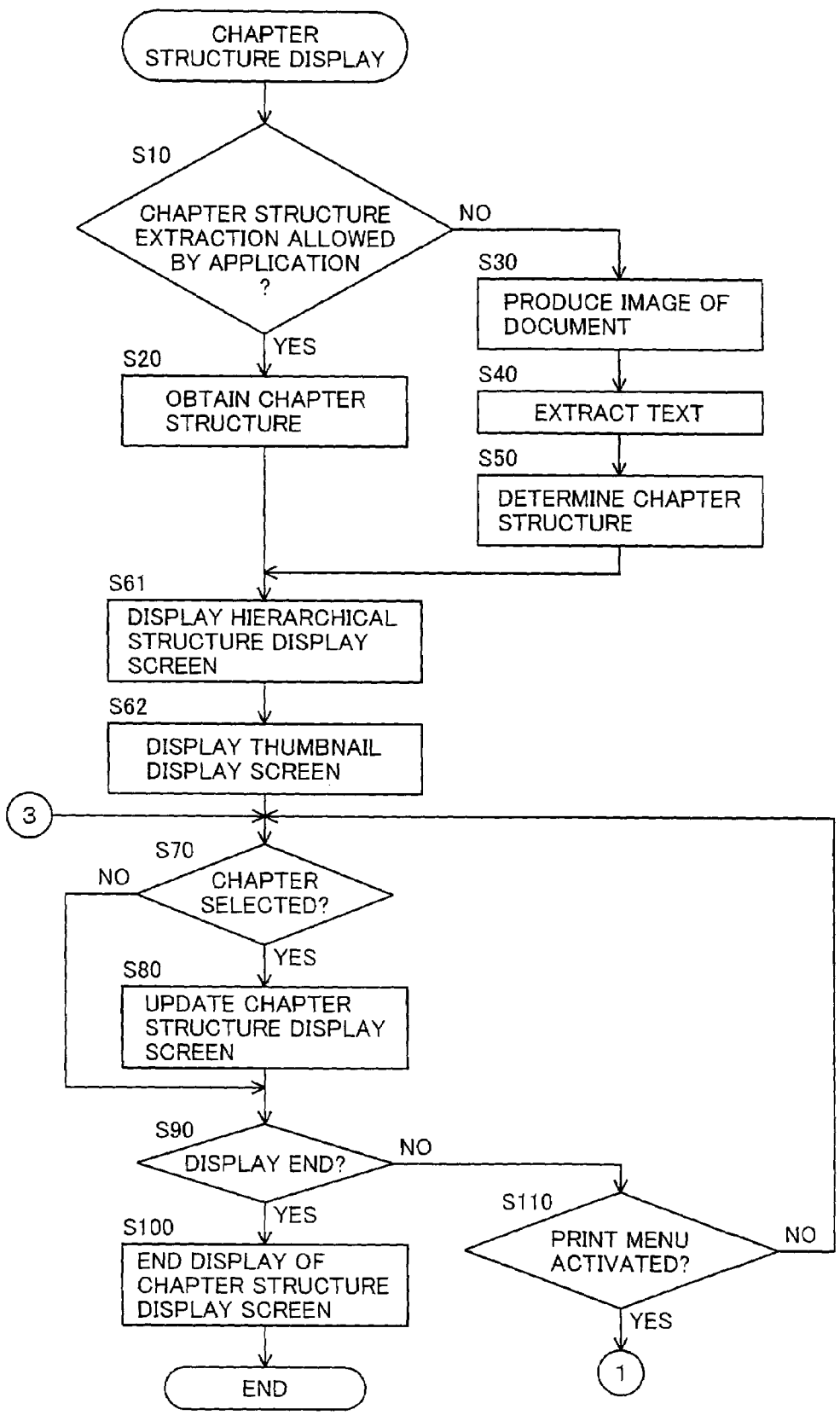
FIGS. 6-8 are flow charts of the chapter structure display process executed by a CPU (Central Processing Unit) of FIG. 3.

Referring to FIG. 6, CPU 201 determines whether document 111 that is the current subject of processing is in a file format having a data structure that allows extraction of a chapter structure by application 130 at step S10. The file format with a data structure that allows extraction of a chapter structure includes, for example, an XML document and PTF document, depending upon the type of application 130. When determination is made of such a file format, control proceeds to step S20, otherwise, to step S30.

At step S20, CPU 201 obtains (extracts) the chapter structure of document 111 in conjunction with application 130.

Figure 10A:
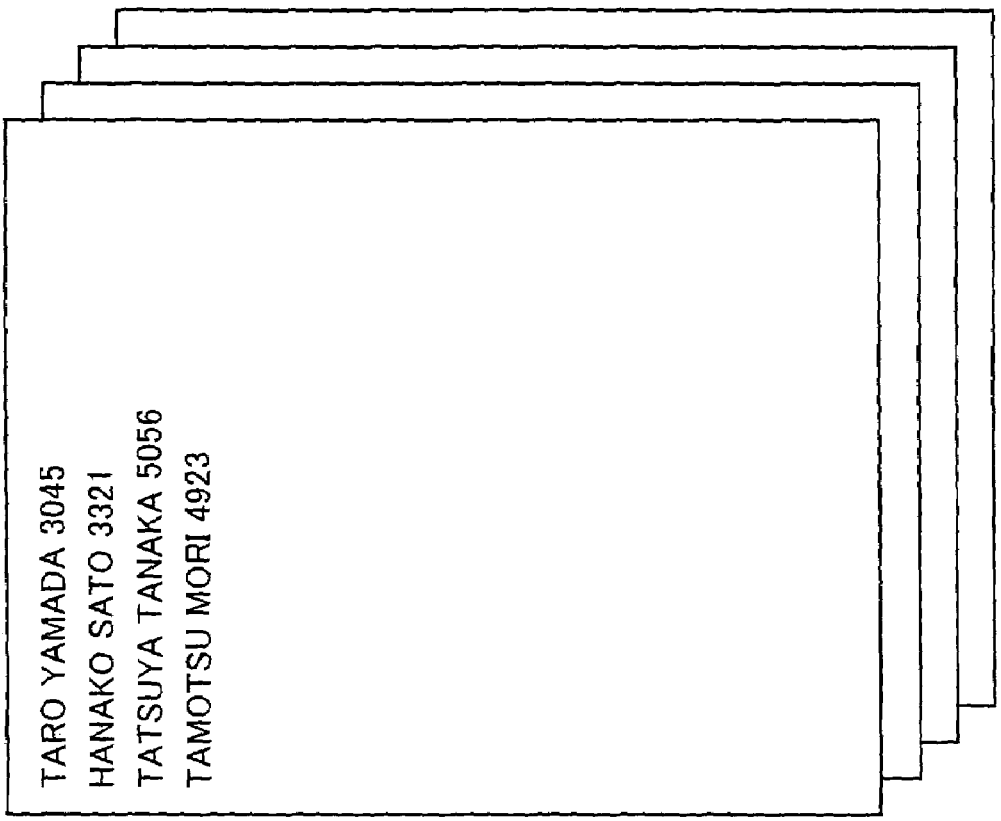
FIGS. 10A and 10B represent the display contents corresponding to the document of FIG. 9.
Figure 10B:
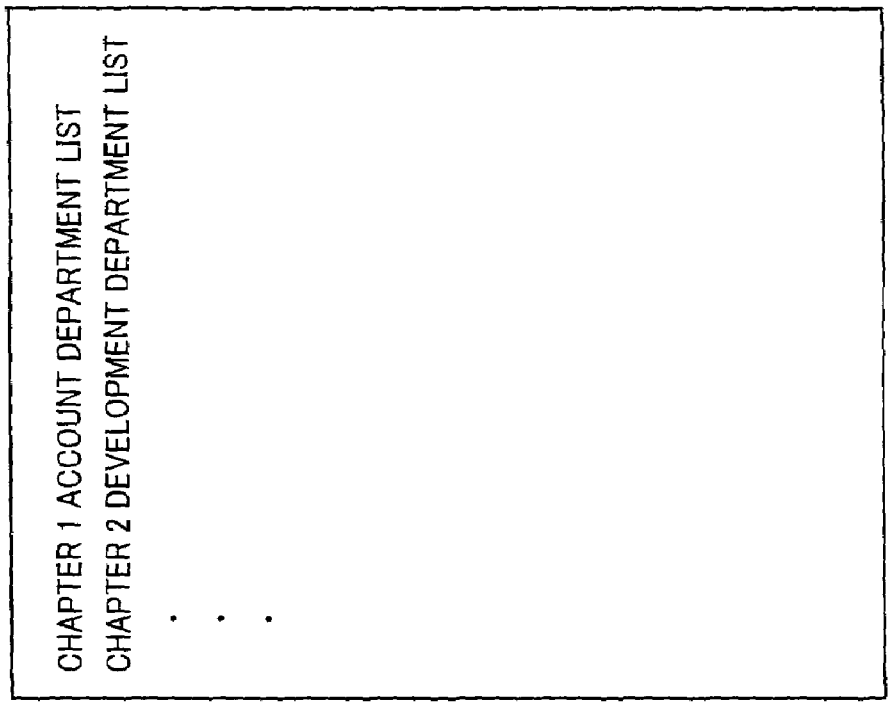
Figures 11, 12:
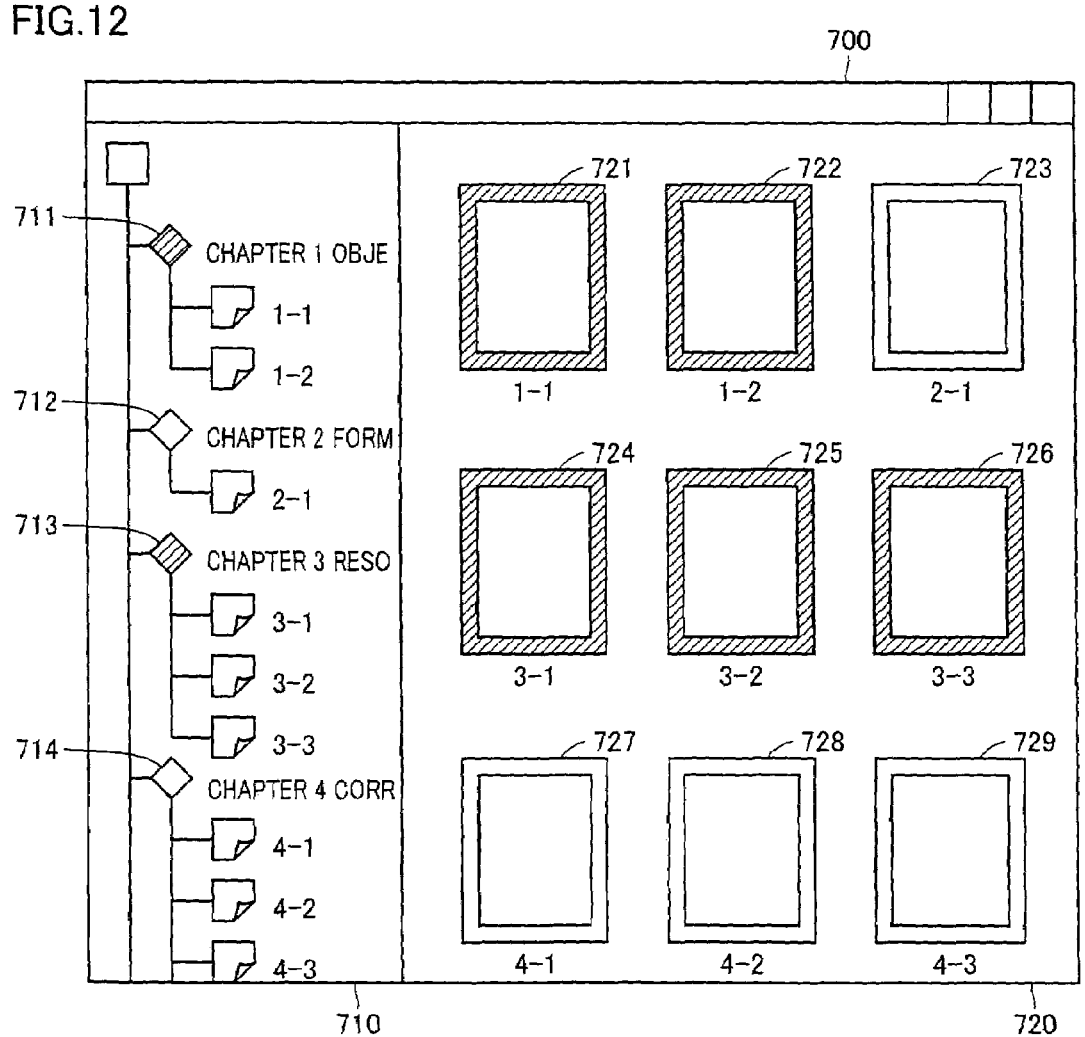
FIG. 11 represents a DTD (Document Type Definition) document corresponding to the document of FIG. 9.
FIGS. 12 and 13 represent examples of a chapter structure display screen presented on the display of FIG. 3 by the process of FIG. 6.

Obtaining the chapter structure of document 111 will be described hereinafter. FIG. 9 represents an XML document as an example of document 111. FIGS. 10A and 10B represent examples of the display contents based on document 111 shown in FIG. 9. FIG. 10A corresponds to a screen displaying a list of the chapters included in document 111. FIG. 10B corresponds to a screen displaying the contents of each chapter in document 111. FIG. 11 represents a DTD document corresponding to document 111 of FIG. 9. The DTD document is an example of a document described in the schema language of the XML document.

It is appreciated from FIG. 10A that chapters 1 and 2 are titled "Account Department List" and "Development Department List", respectively. This is based on the description set forth below in the XML document, as shown in FIG. 9.

Chapter number="1" ctitle="Account Department List"

Chapter number="2" ctitle="Development Department List"

In the XML document, "Chapter number" implies the beginning of a chapter, and the succeeding number represents the chapter number. These are based on the description set forth below in FIG. 11.

<!ATTLIST Chapter number CDATA #REQUESTED>

Further, in the XML document, the string of characters described succeeding "ctitle" implies the title of the chapter. This is based on the description set forth below in FIG. 11.

<!ATTLIST Chapter ctitle CDATA #REQUESTED>

It is appreciated from FIG. 10B that document 111 includes the data of "Taro Yamada 3045" and "Hanako Sato 3321", . . . in chapter 1. This is based on the description set forth below in FIG. 9.

<Person>
Taro Yamada 3045
</Person>
<Person>
Hanako Sato 3321
</Person>

The item of "Taro Yamada 3045" and the like are structural elements of a chapter. This is based on the description set forth below in FIG. 11.

<!ELEMENT Chapter (Person+)>

Thus, at step S20, the tree structure set forth above with reference to FIG. 4 is obtained based on the description in document 111 (and, if necessary, the document described in the corresponding schema language).

At step S30, CPU 201 produces an image of document 111.

At step S40, CPU 201 extracts text information from the image obtained at step S30 using an OCR (Optical Character Reader), or the like.

At step S50, CPU 201 determines the chapter structure based on the text information obtained at step S40. Then, control proceeds to step S61. Specifically at step S50, the chapter structure described with reference to FIG. 4 is obtained by, for example, the character size, line spacing and the like of the text information. Further specifically, the chapter structure is determined based on a line in which characters are larger than the characters in other lines, identified as the starting point of a chapter.

At step S61, CPU 201 displays a hierarchical structure display screen on display 210 based on the chapter structure of document 111. A hierarchical structure display screen is a screen that displays the tree structure of the chapters and pages included in document 111.

At step S62, CPU 201 displays a thumbnail display screen including a thumbnail image of each page in document 111 together with the hierarchical structure display screen provided at step S61.

FIG. 12 represents a chapter structure display screen presented at the display 210 by the process of steps S61 and S62.

Referring to FIG. 12, a chapter structure display screen display screen 700 includes a hierarchical structure display screen 710 and a thumbnail display screen 720.

In hierarchical structure display screen 710, the tree structure of the chapters (chapter 1—fourth chapter) and the pages in each chapter of document 111 is displayed. Further, chapter selection blocks 711-714 corresponding to respective chapters are displayed. At the right side of each of chapter selection blocks 711-714 in hierarchical structure display screen 710, the first four characters of the title of each chapter (four characters in full size; up to 8 characters in half-size) are presented. As described with reference to FIGS. 9-11, CPU 201 can obtain the title of each chapter in document 111 when the tree structure of document 111 is obtained. The obtained title of each chapter is displayed in hierarchical structure display screen 710.

In thumbnail display screen 720, thumbnail images 721-729 of respective pages in document 111 are displayed. Below each of thumbnail images 721-729, two numbers with a hyphen therebetween such as "1-1" are located. The number before the hyphen represents the chapter to which the corresponding page belongs. The number succeeding the hyphen represents the page number in the chapter to which the corresponding page belongs. For example, the notation of "3-2" located beneath thumbnail image 725 refers to the second page in chapter 3.

The user can select the subject of printing on a chapter-by-chapter basis in document 111 by appropriately operating keyboard 209, or the like. In hierarchical structure display screen 710, appropriate cells in chapter selection blocks 711-714 corresponding to the selected chapter are displayed in highlight. In thumbnail display screen 720, the outer frame of the thumbnail image included in the selected chapter, among thumbnail images 721-729, is displayed in highlight. FIG. 12 corresponds to the case where the chapters 1 and 3 are selected. Specifically, chapter selection block 711 and chapter selection block 713 are displayed in highlight in hierarchical structure display screen 710. The outer frames of thumbnail images 721-722 and thumbnail images 724-726 are displayed in highlight in thumbnail display screen 720.

Referring to the flow chart of FIG. 6 subsequent to the display of a chapter structure display screen by the process of steps S61 and S62, CPU 201 determines whether an operation of selecting a chapter has been made or not at step S70. When determination is made of such an operation, control proceeds to step S80, otherwise, to step S90. The operation of selecting a chapter includes, for example, the operation of clicking any of chapter selection blocks 711-714 with a pointing device. When any chapter selection block is clicked with a pointing device, CPU 201 determines that information has been input with respect to the chapter selection blocks. An operation of canceling chapter selection includes, for example, clicking an appropriate chapter block with a pointing device. Specifically, when chapter selection block 711, for example, is clicked once, chapter 1 is selected and chapter selection block 711 is displayed in highlight. When chapter selection block 711 is clicked again under that state, selection of chapter 1 is canceled, and the highlighted display of chapter selection block 711 is canceled.

In the present embodiment, a plurality of chapters can be selected at the same time. CPU 201 sequentially stores in RAM 202, for example, the information of identifying a chapter under a selected state (selected chapter information) for document 111 that is the current subject of processing. CPU 201 updates the selected chapter information every time an operation of selecting a chapter is input by the user.

At step S80, CPU 201 updates the display contents of the chapter structure display screen according to the current selected chapter information. Then, control proceeds to step S90. Specifically at step S80, CPU 201 updates the display contents of the chapter structure display screen such that only the appropriate ones of chapter selection blocks 711-714 corresponding to the chapter selected by an operation by the user are displayed in highlight, and the outer frames of thumbnail images included in the selected chapter, among thumbnail images 721-729, are displayed in highlight.

Figure 13:
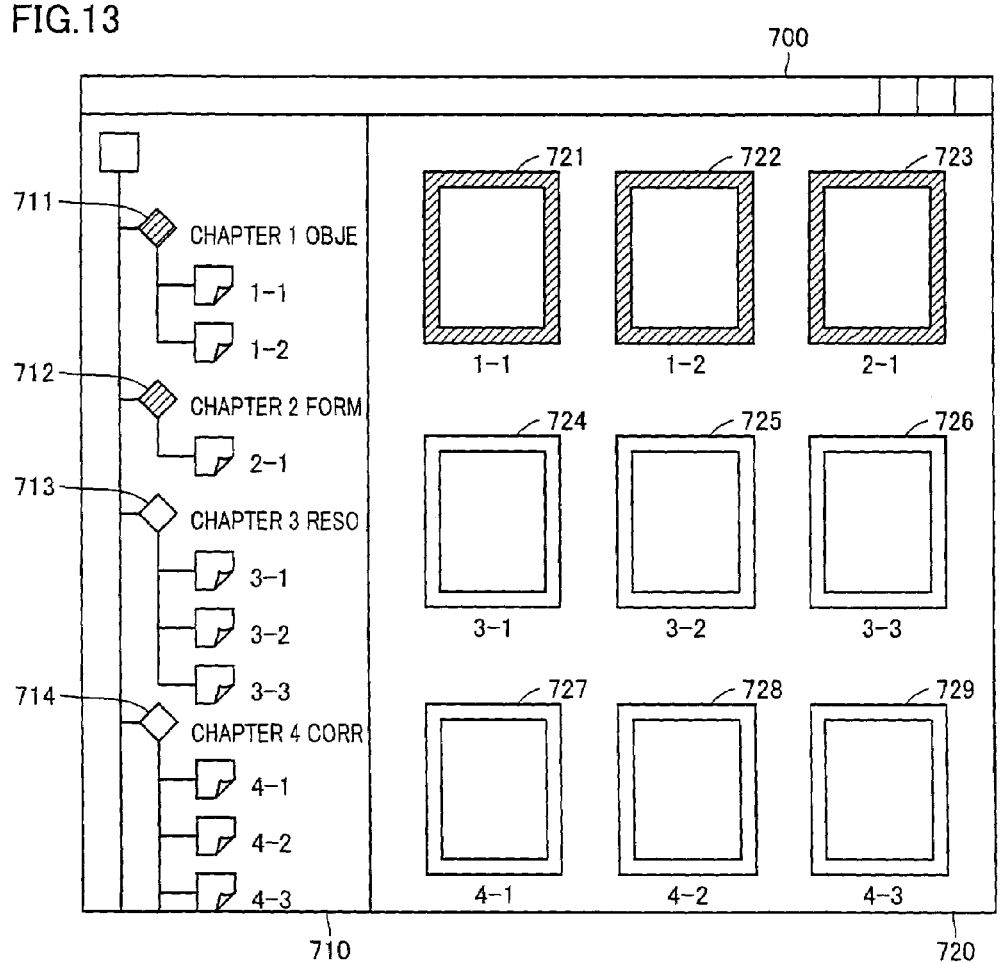

For example, in the case where an operation of selecting chapters 1 and 2 is input by the user when chapter structure display screen display screen 700 of FIG. 12 is presented, a chapter structure display screen 701 shown in FIG. 13 is presented instead of chapter structure display screen 700 on display 210. Referring to FIG. 13, chapter selection block 711 and chapter selection block 712 are displayed in highlight in hierarchical structure display screen 710 of chapter structure display screen 701, and the outer frames of thumbnail images 721-723 are displayed in highlight in thumbnail display screen 720 of chapter structure display screen 701.

At step S90, CPU 201 determines whether an operation to end display of the chapter structure display screen has been input by the user. When determination is made of such an operation, control proceeds to step S100, otherwise, to step S110.

At step S110, CPU 201 determines whether an operation of activating a menu (print menu) to print out document 111 that is the current subject of processing is input by the user or not. When determination is made of such an operation, control proceeds to step S120, otherwise, to step S70.

Figure 7:
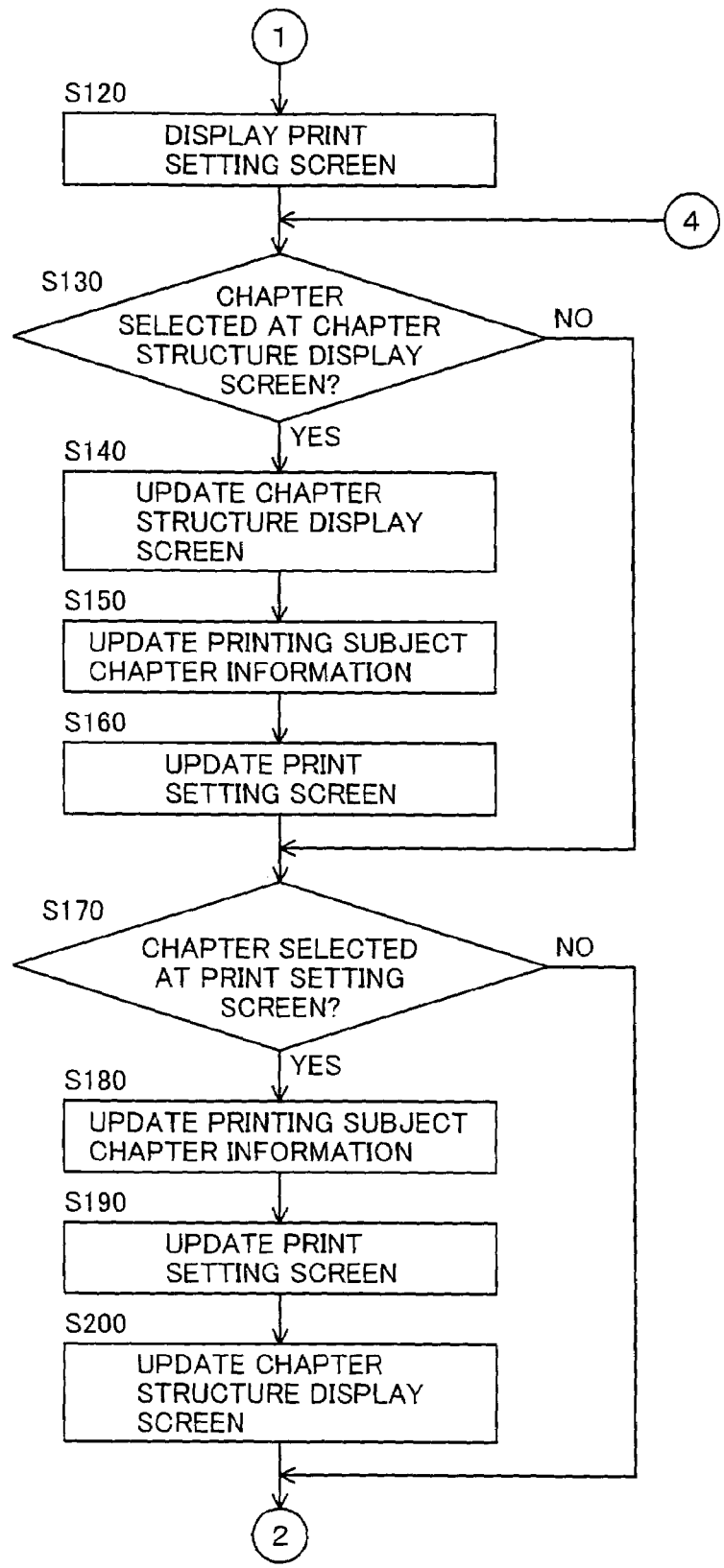

At step S120 in FIG. 7, CPU 201 displays a print setting screen (print setting user interface) at display 210. The print setting screen includes the setting contents related to document printout. The state of a print setting screen displayed at display 210 is identified as a state of a print menu being activated.

Figure 14:
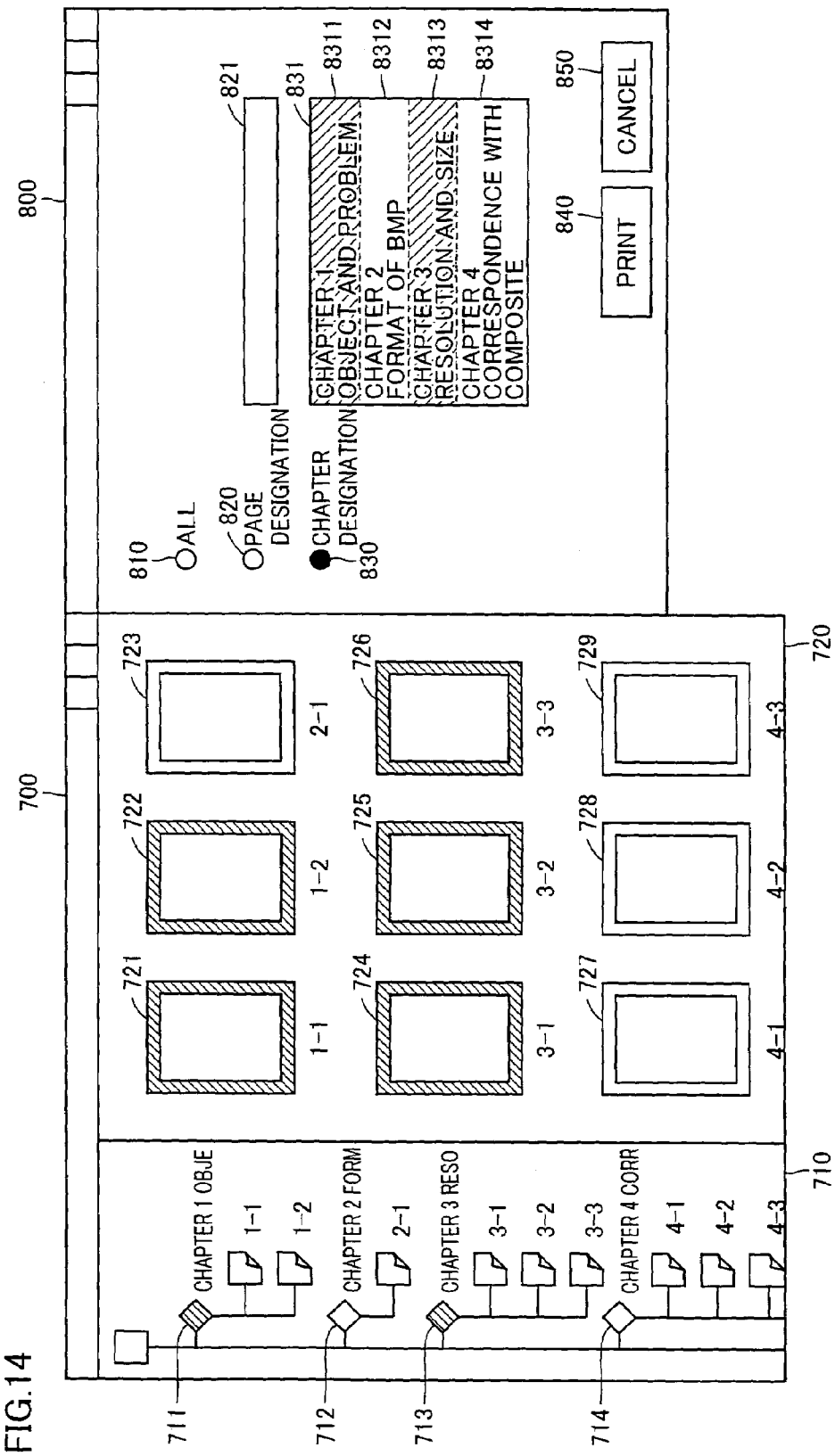
FIGS. 14 and 15 represent examples of a chapter structure display screen and print setting screen presented on the display of FIG. 3 by the process of FIG. 7.

FIG. 14 represents an example of a chapter structure display screen and print setting screen presented at display 210 when the process of step S120 is executed.

In FIG. 14, a print setting screen 800 is displayed adjacent to chapter structure display screen 700.

In print setting screen 800 are displayed a check cell 810 operated when all the pages of document 11 are to be printed out, a check cell 820 operated when only the pages with the page number entered in a page designation window 821 are to be printed out, and a check cell 830 operated when pages included in the chapter selected at a chapter selection window 831 are to be printed out.

Chapter selection window 831 includes chapter selection blocks 831-834 corresponding to the chapters 1-4, respectively, of document 111. In each of chapter selection blocks 831-834, the title of each chapter is displayed together with the chapter number. As described with reference to FIGS. 9-11, CPU 201 can obtain the title of each chapter included in document 111 by obtaining the tree structure of document 111. The title of each chapter obtained as set forth above is displayed at respective chapter selection blocks 8311-8314 in chapter selection window 831.

Print setting screen 800 further includes a print button 840 operated to execute a printing operation, and a cancel button 850 to end display of the print setting screen.

In chapter structure display screen 700, chapter selection blocks 711 and 713 are displayed in highlight, and the outer frames of thumbnail images 721-722 and thumbnail images 724-726 are displayed in highlight, based on the selection of chapters 1 and 3 in document 111. In print setting screen 800 that is displayed simultaneous to chapter structure display screen 700, chapter selection block 8311 and chapter selection block 8313 corresponding to chapters 1 and 3, respectively, are displayed in highlight in chapter selection window 831.

Although print setting screen 800 is displayed adjacent to chapter structure display screen 700 at display 710 in FIG. 14, the position relationship of these screens is not limited thereto.

Referring to FIG. 7 again subsequent to the display of a print setting screen at step S120, CPU 201 determines whether an operation of selecting a chapter has been made on chapter structure display screen 700 at step S130. When determination is made of such an operation, control proceeds to step S140, otherwise, to step S170.

At step S140, CPU 201 updates the display contents of the chapter structure display screen so as to correspond to the operation of the user identified at step S130. Then, control proceeds to step S150. Specifically, CPU 201 updates the display contents such that only the blocks corresponding to the selected chapter are displayed in highlight among chapter selection blocks 711-714, and the outer frames of only those of thumbnail images 721-729 corresponding to the pages included in the selected chapter are displayed in highlight.

At step S150, CPU 201 updates the printing subject chapter information. The printing subject chapter information identifies the chapter that is the subject of printing in document 111, similar to the above-described selected chapter information.

At step S160, CPU 201 updates the display contents of the print setting screen based on the updated printing subject chapter information. Then, control proceeds to step S170. Specifically at step S160, CPU 201 updates the display contents of the print setting screen such that the appropriate ones of chapter selection blocks 8311-8314 corresponding to the chapter selected by an operation of the user are displayed in highlight.

Figure 15:
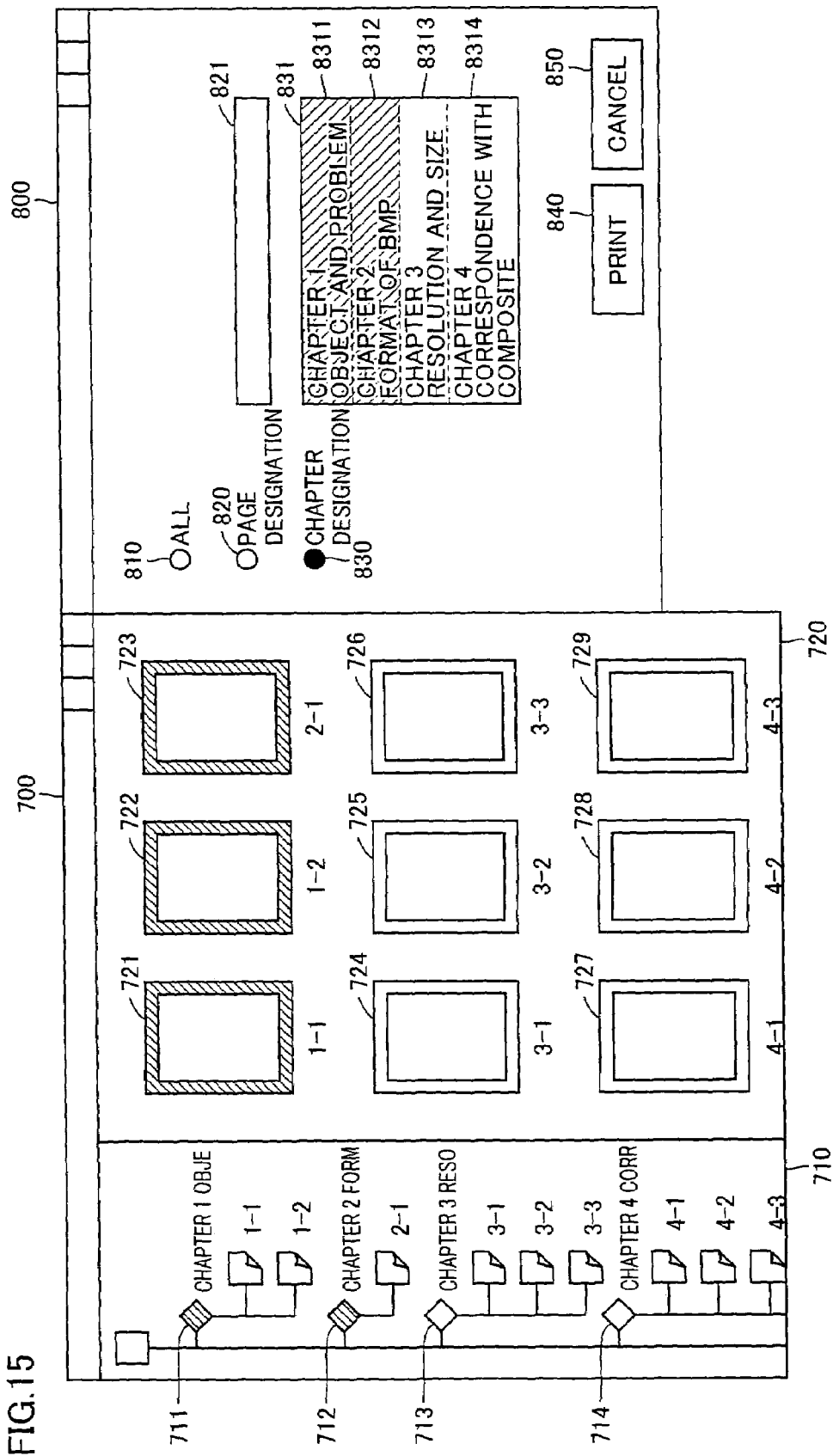

For example, when chapter 2 is newly selected by clicking chapter selection block 712 from the state where chapters 1 and 3 of document 111 are already selected, as shown in FIG. 14, and then chapter selection block 713 is clicked to cancel selection of chapter 3, i.e. when chapters 1 and 2 are selected, display 210 presents a chapter structure display screen 701 and a print setting screen 801 shown in FIG. 15, instead of chapter structure display screen 700 and print setting screen 800 of FIG. 14, respectively.

Chapter structure display screen 701 is similar to the chapter structure display screen of FIG. 13.

Print setting screen 801 includes display contents similar to those of print setting screen 800 of FIG. 14, except for the contents in chapter selection window 831. In print setting screen 801, chapter selection block 8311 and chapter selection block 8312 corresponding to chapters 1 and 2, respectively, are displayed in highlight at chapter selection window 831.

The printing subject chapter information can also be updated by an operation carried out on the print setting screen, instead of on the chapter structure display screen. In other words, the chapter selected as the subject of printing can be modified through an operation on the print setting screen. Such operations include, for example, an operation of clicking any of chapter selection blocks 8311-8314 by a pointing device. Furthermore, an operation of canceling chapter selection includes an operation of clicking an appropriate block by a pointing device. For example, when chapter selection block 8311 is clicked to attain a state where chapter 1 is selected (chapter 1 is included in the printing subject chapter information), chapter selection block 8311 is displayed in highlight. When chapter selection block 8311 is clicked again under such a state, selection of chapter 1 is canceled (chapter 1 is deleted from the printing subject chapter information), and the highlighted display of chapter selection block 83.11 is cancelled.

At step S170, CPU 201 determines whether an operation of selecting a chapter as the subject of printing has been effected or not on the print setting screen. When determination is made of such an operation, control proceeds to step S180, otherwise, to step S210.

At step S180, CPU 201 updates the printing subject chapter information according to the operation, and control proceeds to step S190.

At step S190, CPU 201 updates the display contents of the print setting screen so as to correspond to the updated printing subject chapter information. Then, control proceeds to step S200.

At step S200, the display contents of the chapter structure display screen is updated so as to correspond to the updated printing subject chapter information. Then, control proceeds to step S210.

By the steps of S170-S200, the display contents of a print setting screen is modified according to an operation of selecting a chapter on a print setting screen, comparable to the steps of S130-S160.

Figure 8:
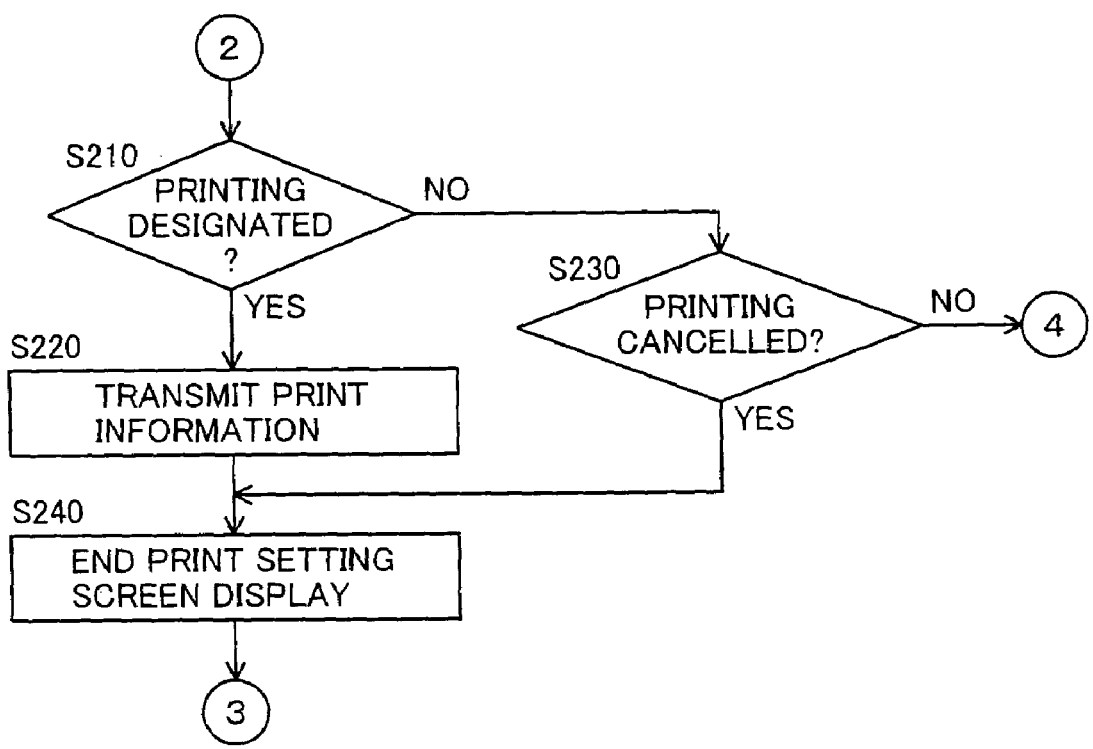

At step S210 of FIG. 8, CPU 201 determines whether an operation of designating printing is input or not. An operation of designating printing includes, for example, an operation of clicking print key 840 on the print setting screen through a pointing device or the like. When determination is made of such an operation, control proceeds to step S220, otherwise, to step S230.

At step S230, CPU 201 determines whether an operation to terminate the print menu is made or not. An operation of terminating the print menu includes, for example, an operation of clicking cancel key 850 on the print setting screen using a pointing device or the like. When determination is made of such an operation, control proceeds to step S240, otherwise, to step S130.

At step S220, CPU 201 transmits document data corresponding to the page attribute of the chapter included in the current printing subject chapter information to output apparatus 500 as the information for printing (data that is the subject of printing). Then, control proceeds to step S240. Accordingly, the pages included in the currently selected chapter are printed out at output apparatus 500.

At step S240, CPU 201 terminates display of the print setting screen on display 210, and control returns to step S70.

In the above-described chapter structure display process, a print setting screen is displayed upon activating a print menu under the state where a chapter structure display screen is displayed. The print setting screen shown in FIGS. 14 and 15 is presented even if the chapter structure display screen is not displayed, as long as the print menu is activated under the state where document 111 is set as the subject of processing in document management apparatus 100.

In other words, when document 111 is to be printed out, a print setting screen is displayed and the range of printing of document 111 can be specified on a chapter-by-chapter basis while viewing the information indicating the contents of each chapter (each chapter number and title) at document management apparatus 100. The information indicating the contents of each chapter is arbitrary, as long as the information can be extracted from document 111.

The above embodiment was described in which document management apparatus 100 executes a program stored in ROM 203 incorporated in document management apparatus 100 or an HD 211 to realize various operations set forth above. Document management apparatus 100 may be implemented to execute various operations set forth above by causing CPU 201 to execute the program recorded on a recording medium that is detachable with respect to document management apparatus 100 through a readout operation by disk controller 207.

The document processing apparatus of the present invention is not limited to the above-described embodiment in which the corresponding chapter is included in the printing subject chapter information by clicking respective blocks displaying each chapter number and title (chapter selection blocks 8311-8314) on the print setting screen. At least each chapter number and title are to be displayed on the print setting screen, and the operation to include each chapter in the printing subject chapter information does not necessarily has to be carried out at such display sites. However, it is consider that the usability of the document processing apparatus by the user can be improved if the corresponding chapter can be included in the printing subject chapter information by carrying out an operation at a site where each chapter number and title are displayed on a print setting screen, as in the present embodiment.

Figure 16:
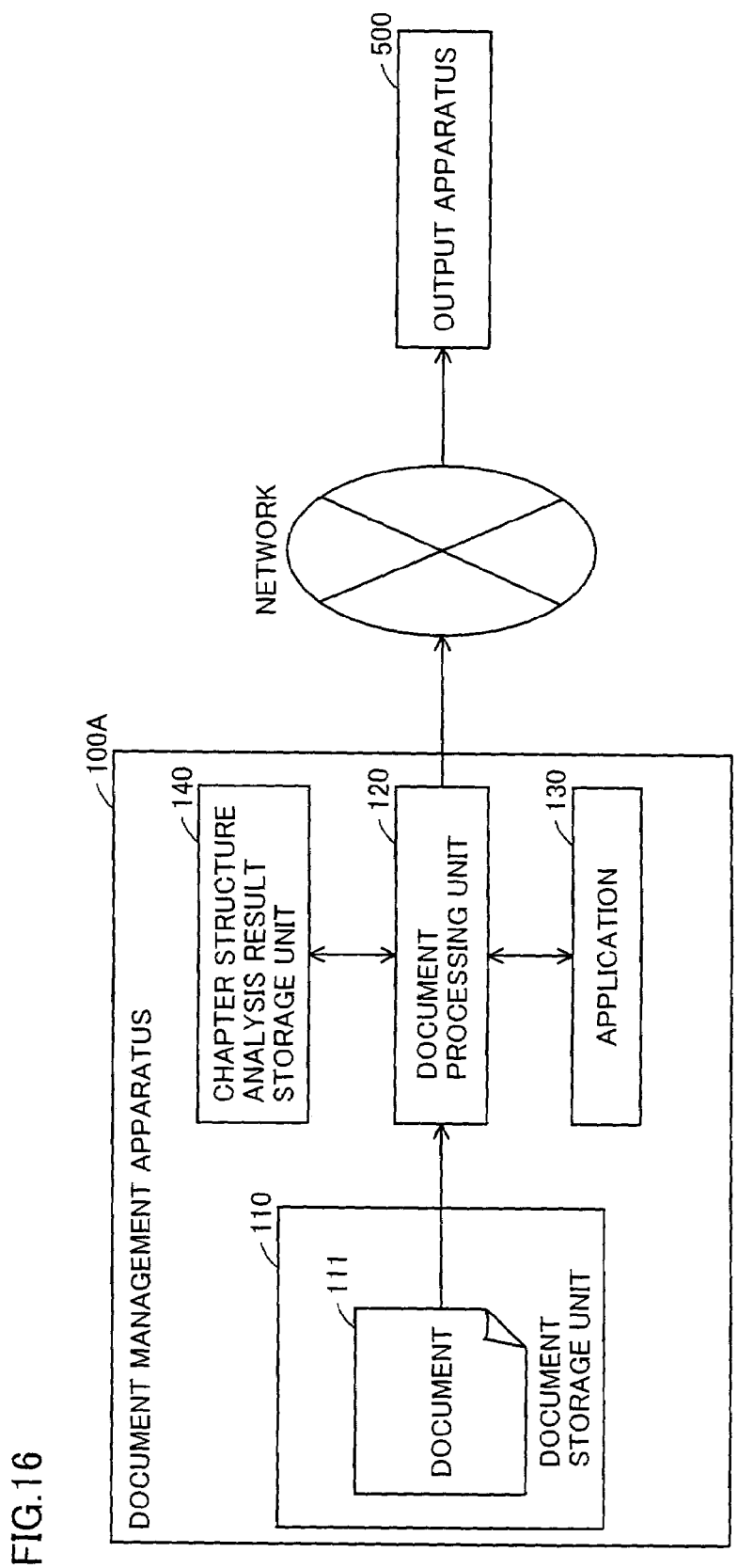
FIG. 16 represents a modification of the document management apparatus of FIG. 1.

The configuration of the document processing apparatus of the present invention is not limited to the above-described embodiment in which a process of obtaining the chapter structure of document 111 is executed after designating display of a chapter structure display screen, as described in step S20. The process to obtain a chapter structure of document 111 may be executed prior to designation of display of a chapter structure display screen, such as the point in time where document 111 is stored in HD 211. In such a case, information of the obtained chapter structure is stored in a chapter structure analysis result storage unit 140 provided in a document management apparatus 100A (modification of document management apparatus 100 of FIG. 1), as shown in FIG. 16.

Second Embodiment

A document management apparatus according to a second embodiment of the document processing apparatus of the present invention has a hardware configuration and software configuration similar to those of document management apparatus 100 described in the first embodiment.

Figure 17:
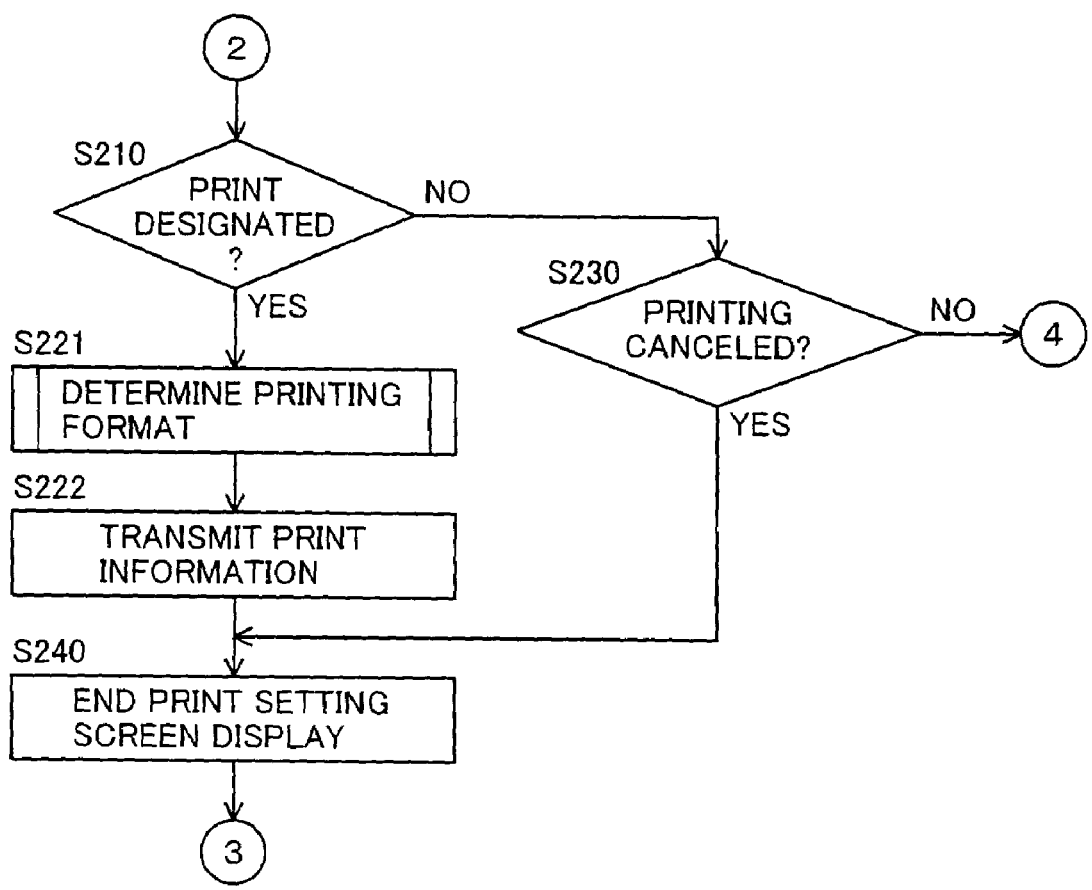
FIG. 17 is a flow chart of a chapter structure display process executed by the CPU of the document management apparatus identified as a second embodiment of the document processing apparatus of the present invention.

The chapter structure display process executed by the document management apparatus of the second embodiment corresponds to a partially modified version of the process executed by the document management apparatus of the first embodiment. Specifically, when determination is made of an operation of designating printing at step S210, as shown in FIG. 17, control proceeds to step S221.

At step S221, CPU 201 of the document management apparatus of the second embodiment (hereinafter, simply referred to as "CPU 201") executes a process of determining the printing format of the chapter included in the printing subject chapter information, and control proceeds to step S222.

At step S222, CPU 201 transmits the printing information to output apparatus 500 based on the result of step S221. Then, control proceeds to step S240.

The processing contents of step S240 are similar to those of the first embodiment.

The contents of the process of the step S2211 (printing format determination process) will be described in detail hereinafter with reference to FIG. 18.

Figure 18:
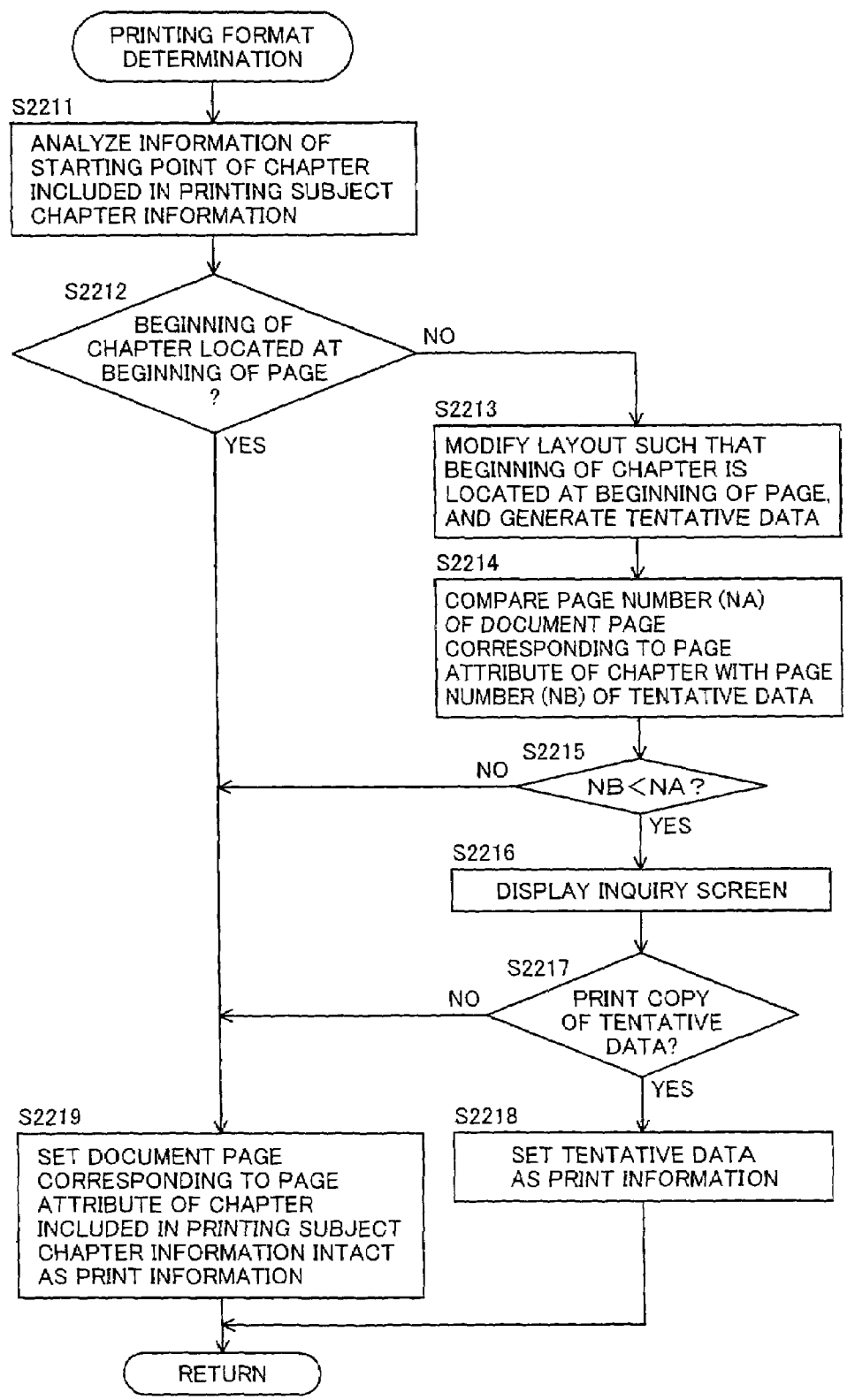
FIG. 18 is a flow chart of a subroutine of a printing format determination process of FIG. 17.

In accordance with the printing format determination process of FIG. 18, CPU 201 analyzes where the beginning of the chapter included in the current printing subject chapter information (page 1 in relevant chapter) is located on a page at step S2211 by referring to the corresponding page attribute. Then, control proceeds to step S2212.

At step S2212, CPU 201 determines whether the beginning of the chapter is located at the starting point of a page based on the analyzed result of step S2211. When the beginning of the chapter is located at the beginning of a page, control proceeds to step S2219, otherwise, to step S2213.

At step S2213, CPU 201 generates page data with the layout modified such that the beginning of the chapter of the printing subject chapter is located at the beginning of a page. The generated page data is stored in RAM 202 as tentative data. Then, control proceeds to step S2214.

At step 2214, CPU 201 compares the number of pages of the document page corresponding to the chapter page attribute with the number of pages of the tentative data generated at step S2213, and proceeds to step S2215. For the sake of convenience, the former number of pages is represented as NA, and the latter number of pages is represented as NB.

At step S2215, CPU 201 determines whether NB is smaller than NA, i.e. whether the number of pages of the tentative data generated at step S2213 is smaller than the number of pages of the chapter included in the printing subject chapter information. When determination is made of NB being smaller than NA, control proceeds to step S2216, otherwise, to step S2219.

At step S2216, CPU 201 displays an inquiry screen at display 210, and proceeds to step S2217. An inquiry screen includes a message of notifying that, when the layout is modified so as to print out the chapter that is the subject of printing from the beginning of a page, the number of pages is reduced than the case where the layout is not modified, and a message of prompting input of information indicating whether such layout modification is to be carried out for print out is presented.

At step S2217, CPU 201 determines whether such information of desiring layout modification and print out is input or not, i.e. whether information of desiring tentative data to be used for printing is input or not. When determination is made of input of such information, control proceeds to step S2218, otherwise, to step S2219.

At step S2218, CPU 201 executes the process of setting the tentative data as the printing information, and then returns the control.

At step S2219, CPU 201 executes a process of setting the image data corresponding to the page attribute of the chapter included in the current printing subject chapter information as the printing information. Then, control returns.

The above-described printing format determination process is executed, not only when a print menu is activated under the state where the chapter structure display screen is displayed, but also in the case where printing is designated by the user even when a print menu is activated under the state where a chapter structure display screen is not displayed.

The above-described printing format determination process is executed for each chapter when there are a plurality of chapters in the printing subject chapter information.

The present invention may be implemented such that, when a plurality of chapters are included in the printing subject chapter information, a printing format determination process is executed for each chapter, and tentative data based on the layout in which all the chapters are to be printed out continuously is generated. Further, when the number of pages of the tentative data is smaller than the number of pages corresponding to the layout in which each of the plurality of chapters included in the printing subject chapter information is to be printed out independently, the user may be prompted to select which of the printing format is to be used for print out. The aforementioned "all the chapters are to be printed out continuously" implies the case where, when there are chapters 1 and 4, for example, included as the printing subject chapter information, printing is effected such that chapters 1 and 4 are located consecutively. For example, when the end of chapter 1 terminates midway a page, the beginning of the fourth chapter is to be printed out in succession at the succeeding region on the same page.

Each of the embodiments described above can be implemented in combination, as necessary, to the extent possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer readable medium containing a control program of a document processing apparatus executing a process to print out document data stored in a storage device at an output apparatus, causing said document processing apparatus to execute the steps of:

accepting input of information, extracting information related to a chapter from the document data, and causing a display unit to display a print setting screen including setting contents related to printing of document data in response to input of information designating initiation of a process to print out document data, wherein said step of displaying a print setting screen includes the step of displaying information related to each chapter extracted at said extracting step, for each chapter included in the document data, on said print setting screen;

generating tentative data for a printing subject chapter identified as the chapter that is the subject of printing in the document data by modifying a layout of said printing subject chapter under a state stored in said storage device such that the beginning of said printing subject chapter is located at the beginning of a page, comparing the number of pages of said tentative data with a basic number of pages corresponding to the number of pages of said printing subject chapter in the layout under a state stored in said storage device, and causing said display unit to display information asking, when the number of pages of said tentative data is smaller than said basic number of pages, whether printing is to be conducted by a layout based on said tentative data, or by the layout of said printing subject chapter under the state stored in said storage device.

2. A control method of a document processing apparatus executing a process to print out document data stored in a storage device at an output apparatus, comprising the steps of:

accepting input of information, extracting information related to a chapter from the document data, and causing a display unit to display a print setting screen including setting contents related to printing of document data in response to input of information designating initiation of a process to print out document data, wherein said step of displaying a print setting screen includes the step of displaying information related to each chapter extracted at said extracting step, for each chapter included in the document data, on said print setting screen, generating tentative data for a printing subject chapter identified as the chapter that is the subject of printing in the document data by modifying a layout of said printing subject chapter under a state stored in said storage device such that the beginning of said printing subject chapter is located at the beginning of a page, comparing the number of pages of said tentative data with a basic number of pages corresponding to the number of pages of said printing subject chapter in the layout under a state stored in said storage device, and causing said display unit to display information asking, when the number of pages of said tentative data is smaller than said basic number of pages, whether printing is to be conducted by a layout based on said tentative data, or by the layout of said printing subject chapter under the state stored in said storage device.

3. The control method of a document processing apparatus according to claim 2, wherein said step of displaying a print setting screen includes the step of displaying each chapter number and each chapter title as said information related to a chapter.

4. The control method of a document processing apparatus according to claim 2, further causing said document processing apparatus to execute the steps of:

storing information related to a chapter that becomes a subject of printing among chapters included in said document data, and wherein said step of displaying a print setting screen includes the step of displaying a plurality of chapter selection blocks to display information related to each said chapter, said step of storing information related to chapter that becomes the subject of printing includes the step of storing information related to a chapter corresponding to said chapter selection block in response to input of information with respect to said chapter selection block, and said step of accepting input of information includes the step of accepting input of information with respect to a plurality of chapter selection blocks.

5. The control method of a document processing apparatus according to claim 2, further causing said document processing apparatus to execute the steps of:

causing said display unit to display a hierarchical structure display screen showing a tree structure of a chapter included in document data and a page included in each said chapter, and causing said display unit to display a thumbnail display screen showing a thumbnail image of a page included in the document data.

6. The control method of a document processing apparatus according to claim 5, wherein said step of displaying a print setting screen includes the steps of displaying a first display block corresponding to each chapter in the document data at said print setting screen, and displaying a second display block corresponding to each chapter at said hierarchical structure display screen, further causing said document processing apparatus to execute the step of modifying a display format of each said first display block and each said second display block depending upon whether a corresponding chapter is in a selected state or not.

7. The control method of a document processing apparatus according to claim 6, wherein said step of modifying a display format of each said first display block and each said second display block includes the step of switching, when input of information with respect to each said first display block is accepted, between a selected state and non-selected state of a corresponding chapter to control the display format of each said first display block and each said second display block.

8. The control method of a document processing apparatus according to claim 6, wherein said step of modifying a display format of each said first display block and each said second display block includes the step of switching, when input of information with respect to each said second display block is accepted, between a selected state and non-selected state of a corresponding chapter to control a display format of each said first display block and each said second display block.

9. The control method of a document processing apparatus according to claim 2, causing said document processing apparatus to execute the steps of:

generating tentative data by modifying the layout of said printing subject chapter such that, when said printing subject chapter includes a plurality of chapters, all said printing subject chapters are printed out continuously, comparing the number of pages of said tentative data with a total of said basic number of pages of each chapter included in said printing subject chapter, and causing said display unit to display information asking, when the number of pages of said tentative data is smaller than the total of said basic number of pages of each chapter included in said printing subject chapter, whether printing is to be conducted by a layout based on said tentative data or by the layout of said printing subject chapter under the state stored in said storage device by said display control unit.

* * * * *

UNITED STATES PATENT AND TRADEMARK OFFICE
CERTIFICATE OF CORRECTION

PATENT NO.      : 7,619,772 B2
APPLICATION NO. : 11/193414
DATED           : November 17, 2009
INVENTOR(S)     : Kenji Fukudome It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Twenty-sixth Day of October, 2010

David J. Kappos
*Director of the United States Patent and Trademark Office*